Figure 4:
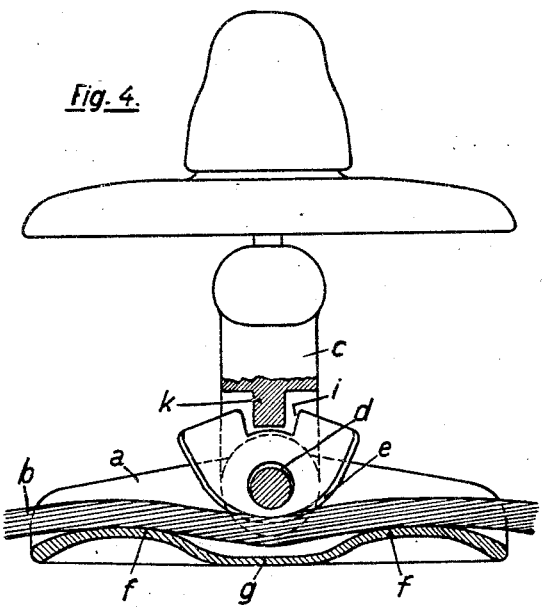

Feb. 16, 1932.  J. W. HOFMANN  1,844,957
SUPPORTING OR CARRYING CLAMP FOR ELECTRICAL OVERHEAD OR AERIAL LINES
Filed Sept. 26, 1930  2 Sheets-Sheet 1
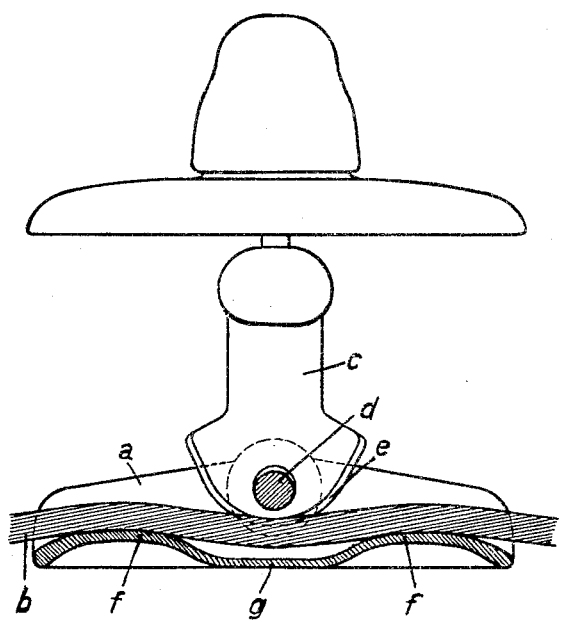
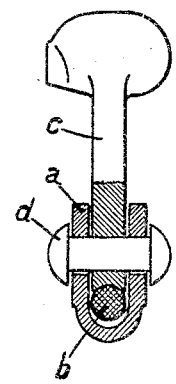
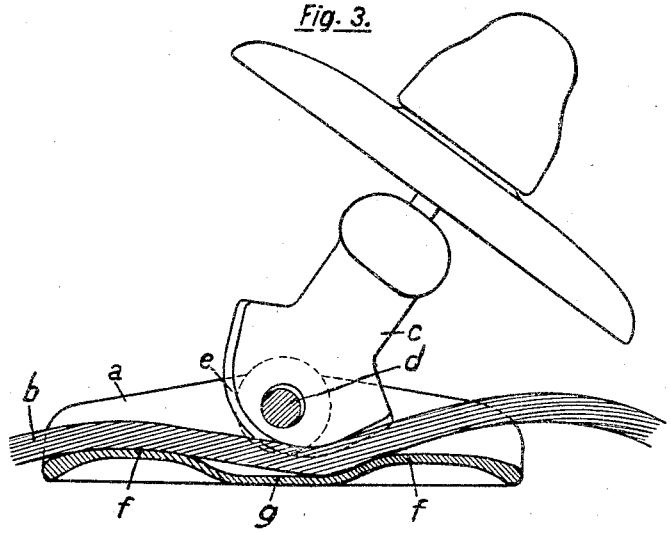

Feb. 16, 1932. J. W. HOFMANN 1,844,957
SUPPORTING OR CARRYING CLAMP FOR ELECTRICAL OVERHEAD OR AERIAL LINES
Filed Sept. 26, 1930 2 Sheets-Sheet 2

Inventor:
Johannes William Hofmann
by his attorneys

Patented Feb. 16, 1932

1,844,957

UNITED STATES PATENT OFFICE

JOHANNES WILHELM HOFMANN, OF KOTZSCHENBRODA, NEAR DRESDEN, GERMANY

SUPPORTING OR CARRYING CLAMP FOR ELECTRICAL OVERHEAD OR AERIAL LINES

Application filed September 26, 1930, Serial No. 484,590, and in Germany February 26, 1930.

The supporting or carrying clamps for electrical overhead or aerial lines effect the adjustment of the conducting cable to the carrying post. Supporting or carrying clamps are used which hold the conducting cable in case of breakage of the latter so firmly that it will not slip through within the clamp; in this case the tension or pull of the cable will nearly entirely have to be borne by the carrying post and the latter will consequently have to be made very strong. There are also used supporting clamps which entirely liberate the conducting cable in case the pull or tension of the latter varies between two adjoining spaces, for instances if any adhering icicles have fallen off or when the conducting cable breaks. These so-called discharge- or sliding-clamps, however, have the disadvantage that the sliding movement of the conductor will not be retarded and the latter will consequently slip through so far that it comes to lie on the earth or to hang near the earth-surface between quite a number of carrying posts. Although the latter are on using such clamps generally protected against damage or breakage and may be made comparatively weak, the repair and re-establishment of the conducting line, however, will take a lot of time and be rather expensive. Furthermore the conducting cables when hanging down will, if not free of current, be liable to injure human beings as well as goods. In order to avoid this disadvantage and to limit the length of slip to a certain measure, it has been proposed to fix onto the conducting cables at a certain distance from the carrying clamps so-called auxiliary clamps, which however in case the conducting cable breaks will effect a sudden jerk on the supporting clamps as well as on the post so that again the latter will be injured.

These disadvantages of the clamps used up to now are avoided by the improvements in the supporting clamp according to the present invention by means of the conducting cable being in its normal state held absolutely firm against undesired sliding, whereas it is permitted on occurance of varying pulls or in case of cable-breakage to slip somewhat, yet is prevented by means of a brake or retarding device from a further slip so that gradually a state of equilibrium is obtained without any jerk or shock.

To this end the supporting clamp consists in a known manner of a carrying mould shaped to form an undulated channel having elevations and an interposed recess and of a member pivotally arranged on the carrying mould and fixed to the insulating chain, the lower end of said member pressing in a normal position the conducting cable into a recess.

In order to do away with the disadvantages connected with the known supporting clamps, according to the present invention the end of the member facing the conducting cable is shaped to form an arc or a curve so that when said member assumes an oblique position in relation to the carrying mould the conducting cable is pressed onto the undulated elevation next to the recess.

The supporting clamp according to the invention can be further so formed that it will be able to easily follow the movements which the conducting cable is apt to make in consequence of mechanical oscillations.

The invention is shown by way of example in the annexed drawings, where

Figure 5:
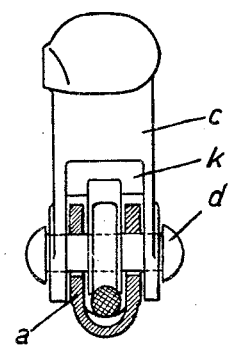
Figure 6:
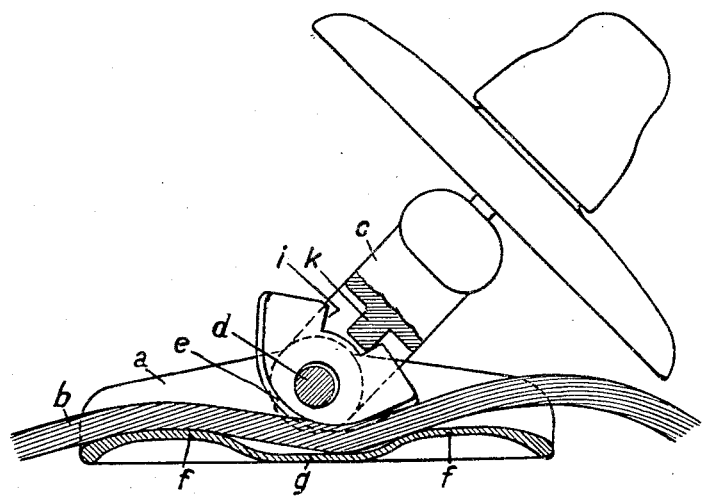

Fig. 1 represents the supporting clamp in section together with the first member of the insulating chain, Fig. 2 represents the supporting clamp partly in side-view, partly in section, Fig. 3 represents the supplying clamp in slip-position, Fig. 4 represents a modification of the supporting clamp in section together with the lowest member of the insulating chain, Fig. 5 represents the same clamp partly in side-view and partly in section, Fig. 6 represents the same supporting clamp in the slip-position.

As shown in the drawings, *a* is the mould-shaped part of the supporting clamp for receiving the conducting cable *b*; *c* is an interposed member formed to connect the supporting clamp with the insulating chain. *d* is a pin by which the carrying mould *a* is jointly connected with the interposed member *c*.

The carrying mould *a* is in the shape of an undulated channel having elevations $ff$ and between them a recess $g$; the mould is again bent downwards towards its ends for the purpose of avoiding that the conducting cable receives a sharp bend at the point where it leaves the clamp, which might otherwise take place owing to the different size of the curves it hangs down in.

In the middle of the carrying mould $a$ the conducting cable $b$ is by means of the interposed member $c$ being curve-shaped in its lower part, partly pressed into the recess $g$ of the carrying mould $a$. Thus the conducting cable $a$ is forced to form undulations within the clamp. By the pull or tension of the cable a great friction occurs at the adjacent surfaces between the conducting cable and the clamp, and the conducting cable will, in accordance with the predetermined bend and the pull or tension of the cable, be firmly held with a more or less large power. This way of firmly holding conducting cables in the supporting clamps is readily understood.

The interposed member $c$ may turn around the pin $d$ and is shaped at its part $e$ lying towards the conducting cable $b$ to form an eccentric arc or curve, the centre point of the arc or curve lying above the point around which the interposed member $c$ pivots, so that a cam action results.

In its normal position the insulator chain hangs down vertically and the supporting clamp horizontally, as seen by Fig. 1. The conducting cable $b$ is by means of the arc-shaped member $c$ pressed so far into the recess $g$ of the carrying mould $a$ as is necessary for obtaining a sufficient holding power. In case now for any reason, for instance breaking of the cable or falling down of any adhering icicles round the cable, a one-side cable-pull occurs, the friction between the cable and the clamp will be reduced and thus the cable will be able to somewhat slip through; at the same time, however, the insulator chain will take an oblique position, as can be seen by Fig. 3. The interposed member $c$ will simultaneously turn round the pin $d$ in consequence of the tension-power exerted onto the hanging chain and powerfully press with its cam surface $e$ onto the conducting cable $b$, whereby the latter is pressed against the clamping mould. The conducting cable will now have to overcome when slipping through the retarding power exerted by the member $c$ and will gradually come to rest without any jerking or pushing action.

By appropriately constructing the part $e$ with a larger or smaller arc-radius it will be possible to change the retarding or braking action at will and adapt the same to use under various working-conditions.

In Figs. 4, 5 and 6 there is shown a modified form of a carrying clamp according to the invention, regard being taken to the mechanical oscillations occurring with overhead lines.

The interposed member $c$ is in this case not directly firmly fixed to the curved part $e$ but the latter is shaped to form a separate cam portion movable in itself. The member $c$ grips fork-like around the carrying mould $a$ and is able to pivot around the pin $d$. Around the said same pin $d$ will also pivot the curved piece $e$ arranged within the carrying mould $a$. The latter piece $e$ possesses at its upper part a notch $i$ into which protrudes the pin $k$ within the member $c$ with a certain space or play. The carrying mould $a$ can pivot together with the curved piece $e$ around the bolt $d$ until one of the two shoulders of the notch $i$ knocks against the pin $k$. The width of the notch $i$, that is, the space between the pin $k$ and the shoulders can be so arranged that the oscillations of the cable will not be hindered. Thus the carrying clamp is in a position to follow the oscillations of the cable without hindrance and without the brake or retarding device of the clamp coming into action. Naturally the pin $k$ may also be arranged on the curved piece $e$ with the corresponding notch on the interposed member $c$.

The carrying clamp according to the invention possesses a sufficient carrying surface for the conducting cable and will hold said cable with a certain power. In case the one-side pull of the cable overcomes the holding power of the clamp the cable will begin to slip through. Said slipping movement is retarded until a state of equilibrium is reached.

The braking or retarding power depends on the differential pull. By providing a lost motion connection within the retarding or braking device the clamp will also be able to follow the oscillations of the cable without hindrance.

What I claim is:

1. A clamp of the character described comprising, a carrying mould shaped to form an undulated channel having a depressed central portion and elevated portions adjacent thereto, and an interposed member pivotally secured to the carrying mould and connected to an insulator chain, said interposed member being provided at its lower end with a cam surface adapted to engage continuously the conducting cable at a point intermediate the elevated mould portions and so formed that the lowest portion of the cam is in engagement with the cable when the interposed member is in a position perpendicular to the length of the mould, whereby the cable will be strongly deflected by the cam surface toward an elevated portion of the mould upon the interposed member being moved away from such perpendicular position.

2. A clamp of the character described comprising, a carrying mould shaped to form an undulated channel having a depressed central portion and elevated portions adjacent thereto, and an interposed member pivotally secured to the carrying mould and connected to an insulator chain, said interposed member being provided at its lower end with a curved cam surface adapted to engage continuously the conducting cable at a point intermediate the elevated mould portions and so formed that the center point of the curve is located above the pivot point around which the interposed member oscillates, whereby the cable will be strongly deflected by the cam surface toward an elevated portion of the mould upon the interposed member being moved away from such perpendicular position.

3. A clamp of the character described comprising, a carrying mould shaped to form an undulated channel having a depressed central portion and elevated portions adjacent thereto, and an interposed member pivotally secured to the carrying mould and connected to an insulator chain, said interposed member being provided at its lower end with a separate cam portion movable with the interposed member through a lost motion connection and adapted to engage continuously the conducting cable at a point intermediate the elevated mould portions and so formed that the lowest portion of the cam is in engagement with the cable when the interposed member is in a position perpendicular to the length of the mould, whereby the cable will be strongly deflected by the cam surface toward an elevated portion of the mould upon the interposed member being moved away from such perpendicular position.

In testimony, that I claim the foregoing as my invention, I have signed my name this 15th day of September 1930.

JOHANNES WILHELM HOFMANN.